US012691965B2

(12) United States Patent 
Nohara

(10) Patent No.: US 12,691,965 B2 
(45) Date of Patent: Jul. 28, 2026

(54) BEHAVIOR CONTROLLER, LEAN VEHICLE, AND BEHAVIOR CONTROL METHOD

(71) Applicant: Robert Bosch GmbH, Stuttgart (DE)

(72) Inventor: Jun Nohara, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 18/291,319

(22) PCT Filed: Jul. 11, 2022

(86) PCT No.: PCT/IB2022/056372
§ 371 (c)(1),
(2) Date: Jan. 23, 2024

(87) PCT Pub. No.: WO2023/007286
PCT Pub. Date: Feb. 2, 2023

(65) Prior Publication Data
US 2024/0326943 A1     Oct. 3, 2024

(30) Foreign Application Priority Data

Jul. 29, 2021     (JP) ................................. 2021-123776

(51) Int. Cl.
*B62J 45/415*      (2020.01)
*B62J 45/412*      (2020.01)
(Continued)

(52) U.S. Cl.
CPC ......... *B62J 45/4152* (2020.02); *B62J 45/412* (2020.02); *B62J 45/414* (2020.02); *B62J 50/21* (2020.02)

(58) Field of Classification Search
CPC .... B62J 45/4152; B62J 45/412; B62J 45/414; B62J 50/21; B62J 45/415
See application file for complete search history.

(56) References Cited

U.S. PATENT DOCUMENTS

2015/0308827 A1* 10/2015 Fujii ...................... G01C 19/00
                                                    702/151
2018/0154968 A1*  6/2018 Awano ................. B60W 40/112
(Continued)

FOREIGN PATENT DOCUMENTS

EP      3133006 A1     2/2017
EP      3335955 A1     6/2018
(Continued)

OTHER PUBLICATIONS

International Search Report and Written Opinion for Application No. PCT/IB2022/056372 dated Sep. 27, 2022 (7 pages).

*Primary Examiner* — Daryl C Pope
(74) *Attorney, Agent, or Firm* — Michael Best & Friedrich LLP

(57)     ABSTRACT

To obtain a behavior controller capable of improving general versatility of a behavior control system for a lean vehicle when compared to a conventional behavior control system.

The behavior controller according to the present invention is a behavior controller that controls behavior of the lean vehicle, and includes: an acceleration information acquisition section that acquires acceleration information in a body up-down direction of the lean vehicle on the basis of output of at least one acceleration sensor; a vehicle velocity information acquisition section that acquires vehicle velocity information of the lean vehicle; and a first angular velocity information acquisition section that acquires first angular velocity information by using the acceleration information and the vehicle velocity information.

11 Claims, 5 Drawing Sheets

(51) Int. Cl.
B62J 45/414        (2020.01)
B62J 50/21         (2020.01)

(56)                References Cited

U.S. PATENT DOCUMENTS

2018/0265117 A1*   9/2018   Hara ...................... B62J 45/412
2019/0276036 A1*   9/2019   Noguchi ............... B60W 30/18
2021/0268982 A1*   9/2021   Skiera ................. B60W 40/107

FOREIGN PATENT DOCUMENTS

EP          3375647 A1     9/2018
JP          H11295335 A    10/1999
JP          2021020645 A   2/2021
KR          20040065727 A  7/2004
WO          2021079494 A1  4/2021

* cited by examiner

[FIG. 1]
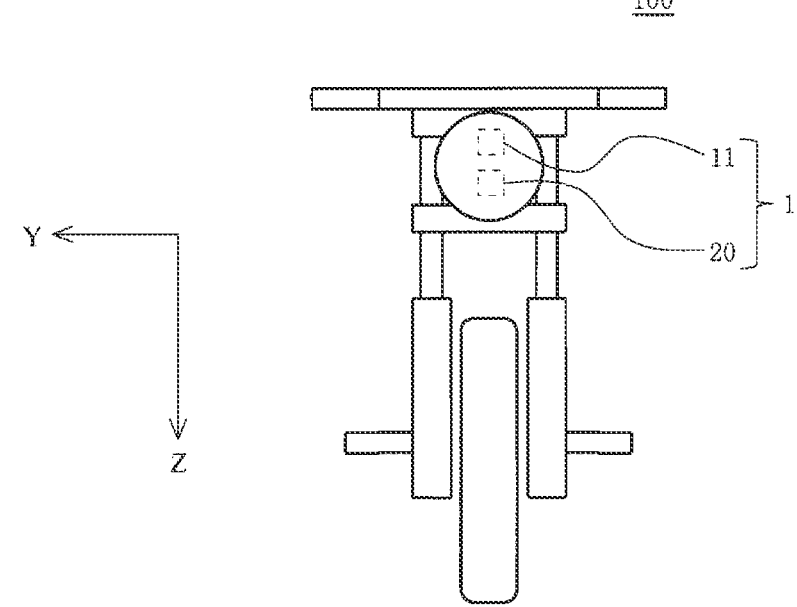
[FIG. 2]
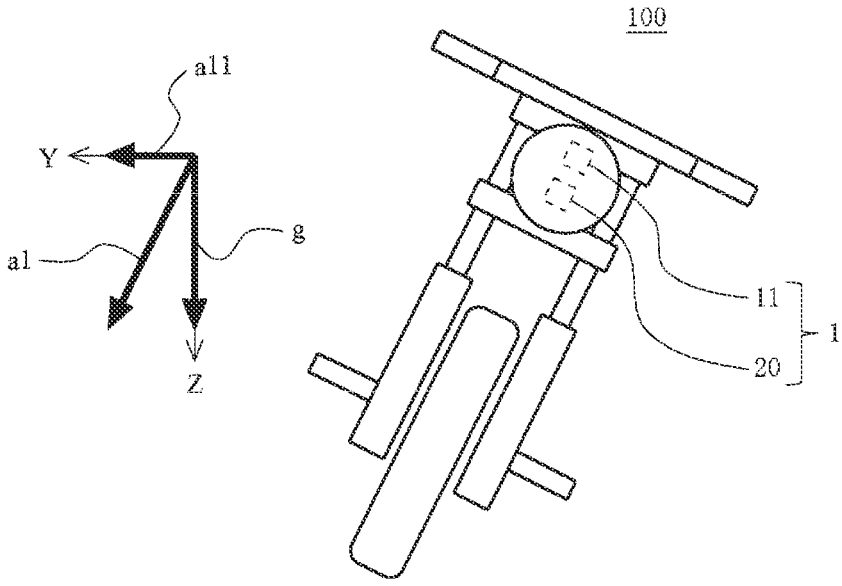

[FIG. 5]
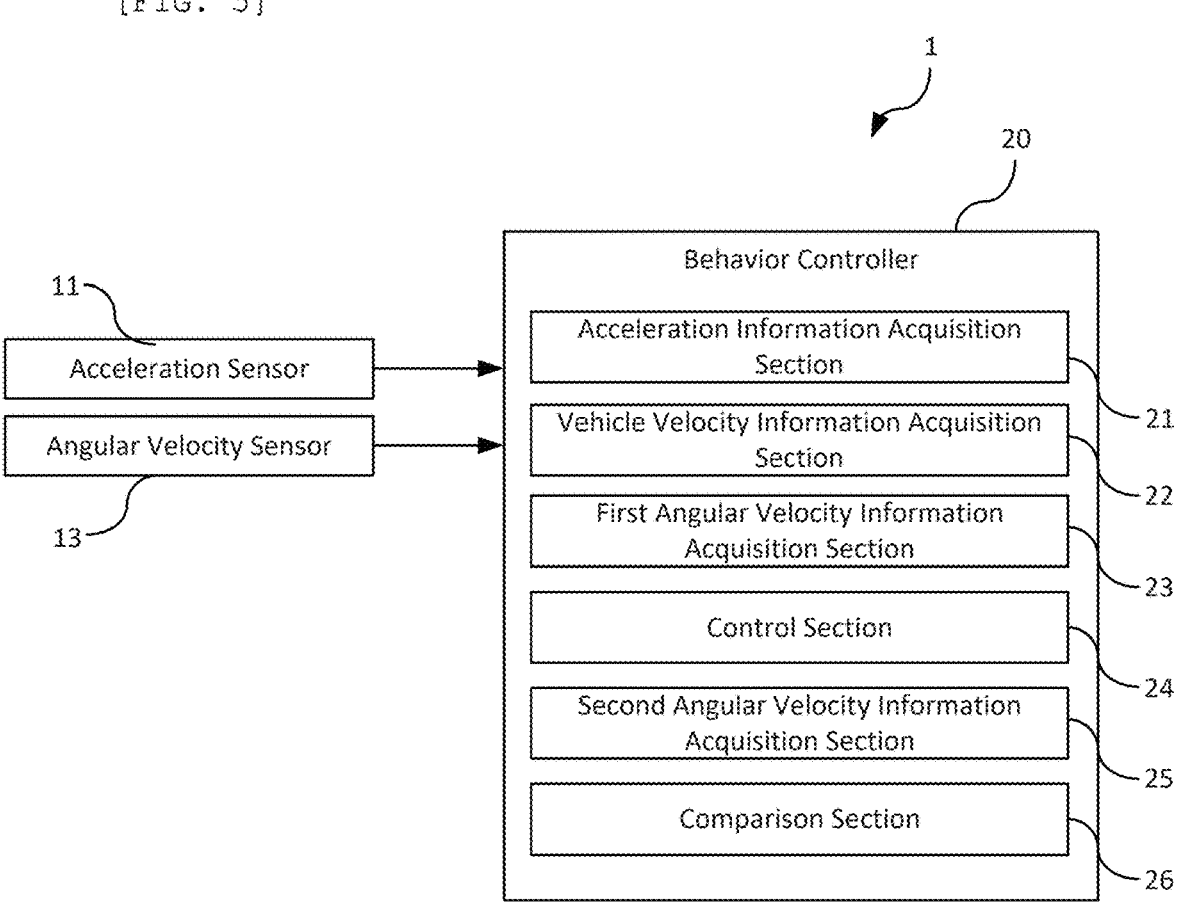
[FIG. 6]
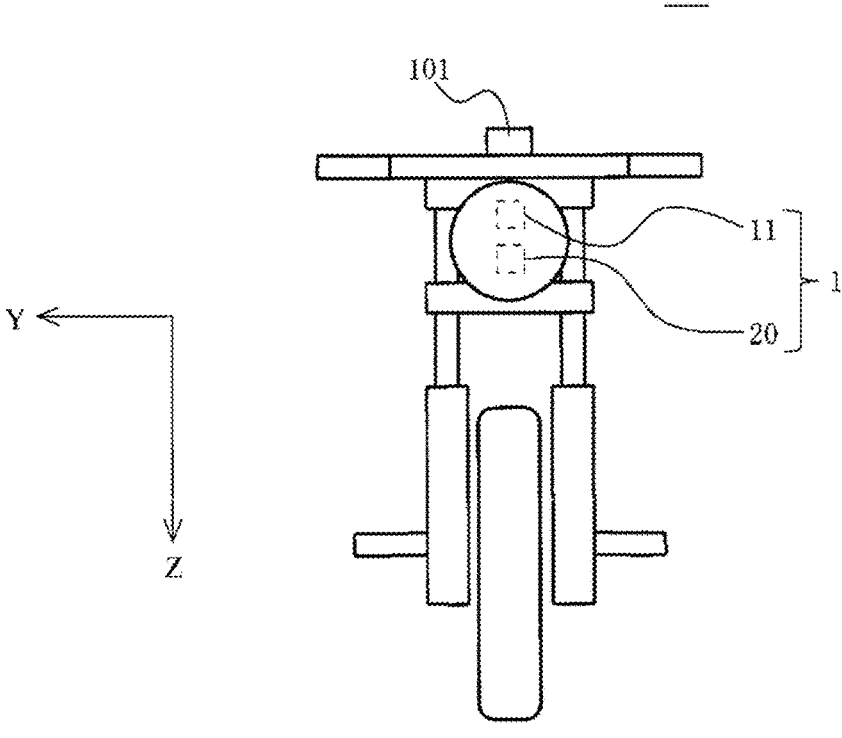

[FIG. 7]
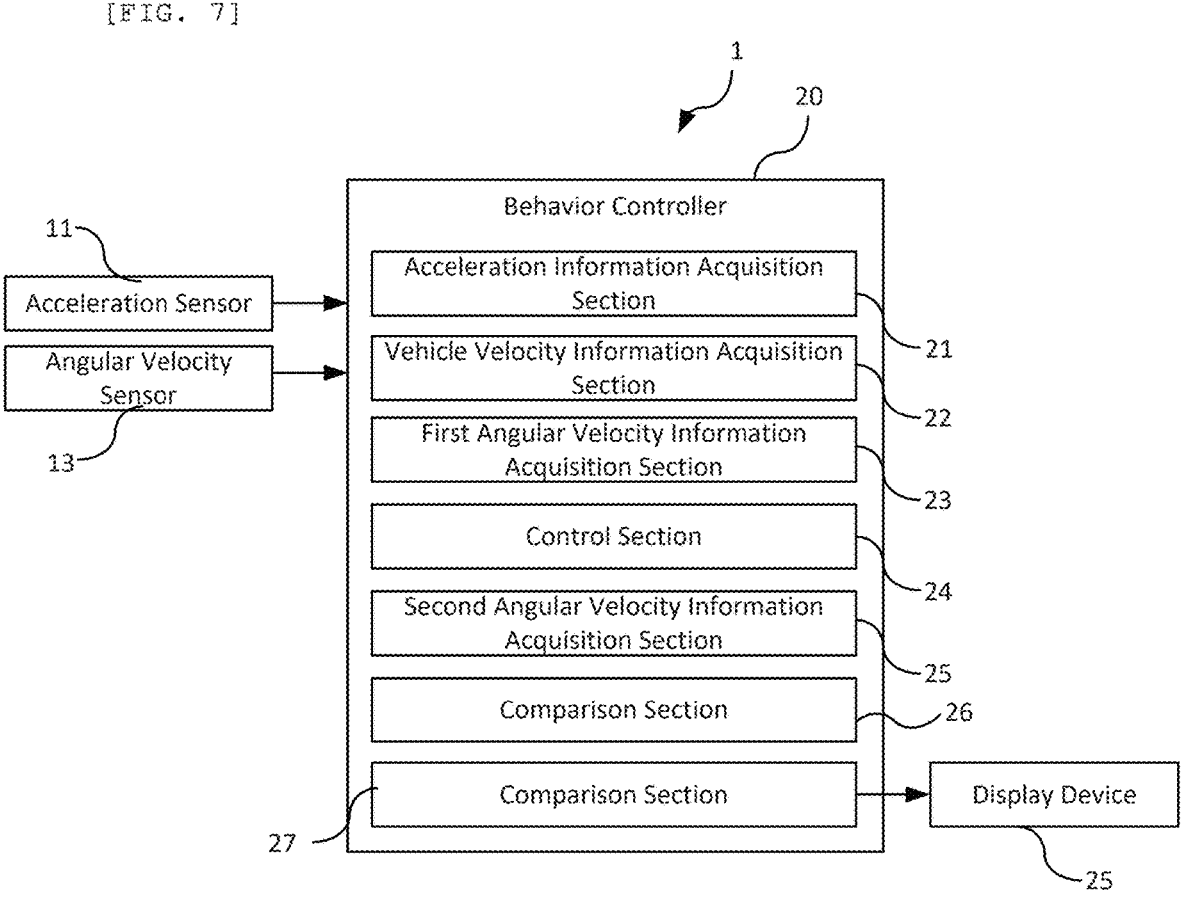
[FIG. 8]
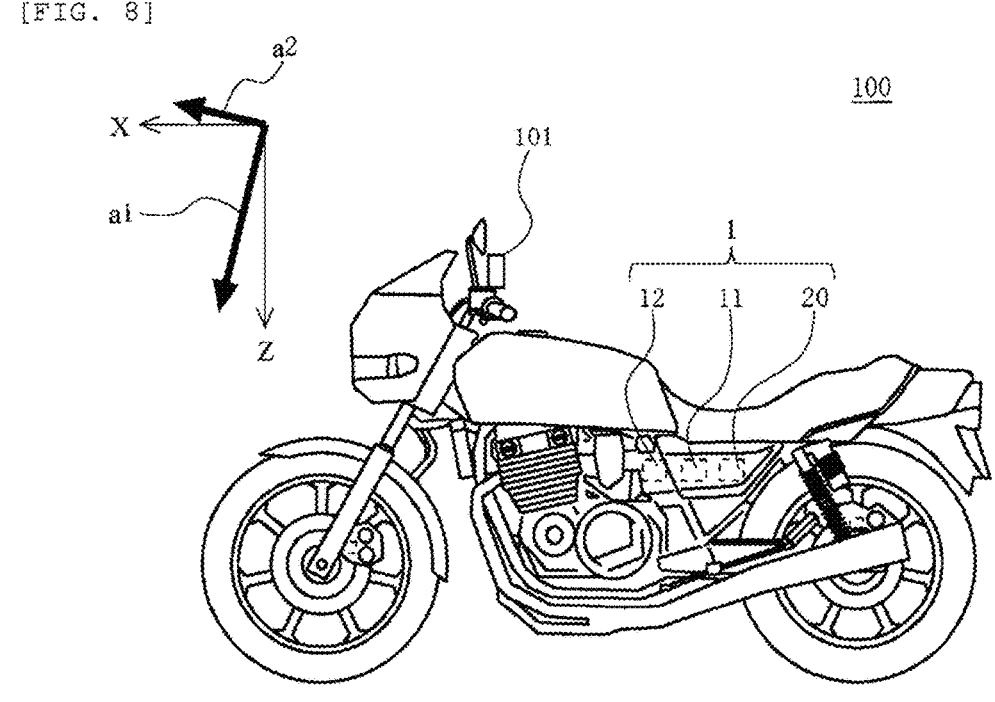

BEHAVIOR CONTROLLER, LEAN VEHICLE, AND BEHAVIOR CONTROL METHOD

BACKGROUND

The present invention relates to a behavior controller that controls behavior of a lean vehicle, a lean vehicle including the behavior controller, and a behavior control method for controlling behavior of a lean vehicle.

One type of a vehicle is a lean vehicle, a body of which is tilted in a turning direction during a turn. Conventionally, a behavior controller that controls behavior of the lean vehicle is configured to control the behavior of the lean vehicle on the basis of output of an inertial measurement unit mounted to the lean vehicle. In other words, conventionally, a behavior control system that controls the behavior of the lean vehicle is configured to include: the inertial measurement unit mounted to the lean vehicle; and the behavior controller that controls the behavior of the lean vehicle on the basis of the output of the inertial measurement unit. For example, in JP-A-2021-020645, a two-wheeled motor vehicle as one type of the lean vehicle is disclosed. The behavior controller for this two-wheeled motor vehicle is configured to control a brake system on the basis of the output of the inertial measurement unit and thereby control behavior of the two-wheeled motor vehicle.

Here, the inertial measurement unit includes: an acceleration sensor that detects acceleration in mutually orthogonal three-axis directions; and an angular velocity sensor that detects an angular velocity around each of the above-described three axes. In other words, the inertial measurement unit includes the three acceleration sensors and the three angular velocity sensors.

SUMMARY OF THE INVENTION

The conventional behavior controller for the lean vehicle is based on a premise of controlling the behavior of the lean vehicle on the basis of output of each of the sensors in the inertial measurement unit. That is, the conventional behavior control system for the lean vehicle must always include the three acceleration sensors and the three angular velocity sensors. Thus, there has been a problem that the conventional behavior control system for the lean vehicle is not generally versatile.

The present invention has been made with the above-described problem as the background and therefore has a purpose of obtaining a behavior controller capable of improving general versatility of a behavior control system for a lean vehicle in comparison with a conventional behavior control system. The present invention has a second purpose of obtaining a lean vehicle that includes such a behavior controller. The present invention has a third purpose of obtaining a behavior control method capable of improving general versatility of a behavior control system for a lean vehicle in comparison with a conventional behavior control system.

A behavior controller according to the present invention is a behavior controller that controls behavior of a lean vehicle, and includes: an acceleration information acquisition section that acquires acceleration information in a body up-down direction of the lean vehicle on the basis of output of at least one acceleration sensor; a vehicle velocity information acquisition section that acquires vehicle velocity information of the lean vehicle; and a first angular velocity information acquisition section that acquires first angular velocity information by using the acceleration information and the vehicle velocity information.

A lean vehicle according to the present invention includes the behavior controller according to the present invention.

A behavior control method according to the present invention is a behavior control method for controlling behavior of a lean vehicle, and includes: an acceleration information acquisition step of acquiring acceleration information in a body up-down direction of the lean vehicle on the basis of output of at least one acceleration sensor; a vehicle velocity information acquisition step of acquiring vehicle velocity information of the lean vehicle; and an angular velocity information acquisition step of acquiring angular velocity information by using the acceleration information and the vehicle velocity information.

In the present invention, the angular velocity information is acquired on the basis of the output of the acceleration sensor. Thus, the behavior control system for the lean vehicle that uses the present invention does not always have to include all sensors in an inertial measurement unit. Therefore, the present invention can improve general versatility of the behavior control system for the lean vehicle when compared to a conventional behavior control system.

BRIEF DESCRIPTION OF THE DRAWINGS

FIG. 1 is a front view of a lean vehicle according to a first embodiment of the present invention.

FIG. 2 is another front view of the lean vehicle according to the first embodiment of the present invention.

FIG. 5 is a block diagram illustrating a behavior control system according to a second embodiment of the present invention.

FIG. 6 is a front view of a lean vehicle according to a modified example of the second embodiment of the present invention.

FIG. 7 is a block diagram illustrating a behavior control system for a lean vehicle according to the modified example of the second embodiment of the present invention.

FIG. 8 is a side view of a lean vehicle according to a third embodiment of the present invention.

DETAILED DESCRIPTION

Figure 3:
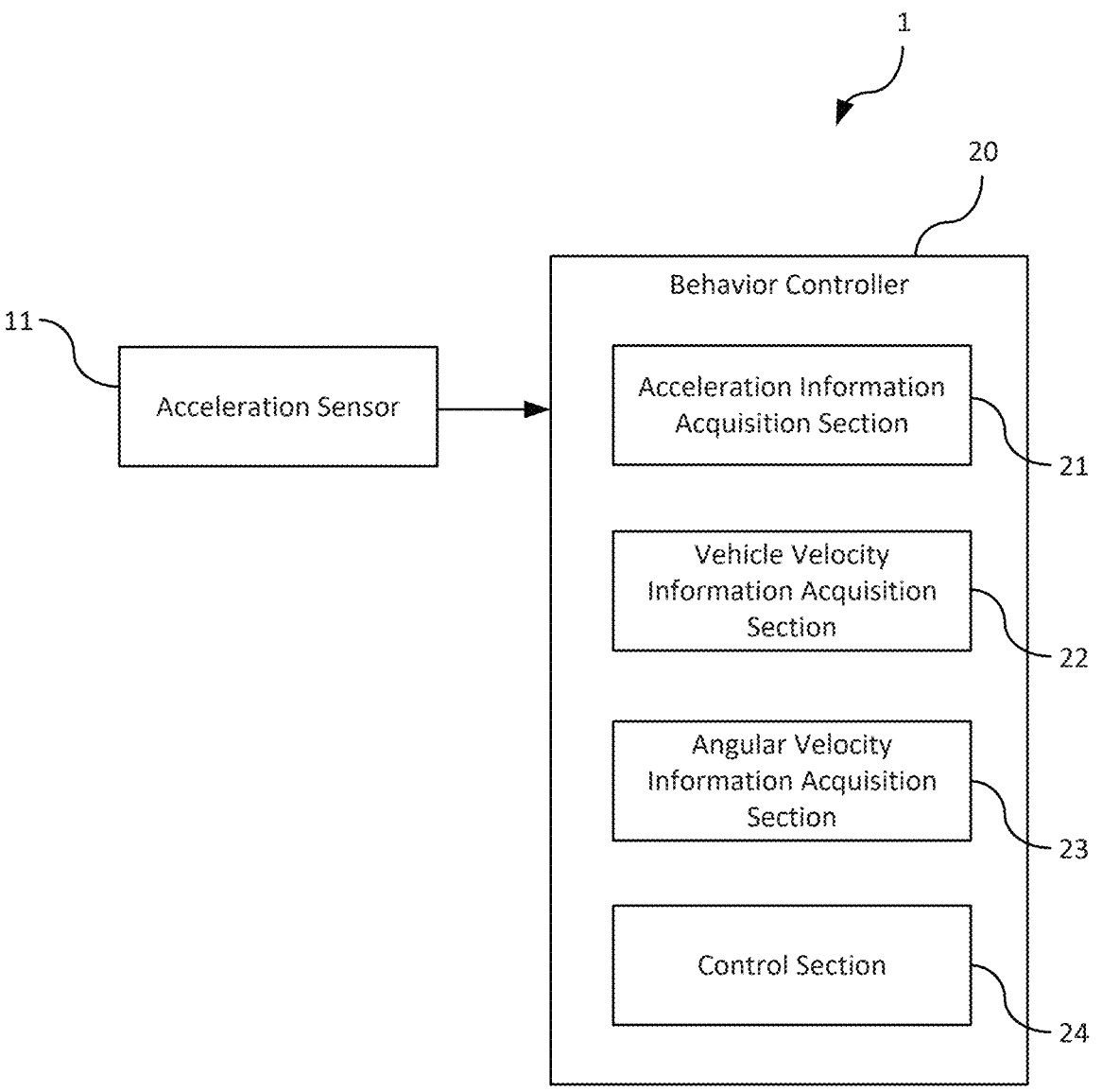
FIG. 3 is a block diagram illustrating a behavior control system according to the first embodiment of the present invention.

A description will hereinafter be made on a behavior controller, a lean vehicle, and a behavior control method according to the present invention with reference to the drawings.

A configuration, operation, and the like, which will be described below, constitute merely one example of the present invention, and the present invention is not limited to a case with such a configuration, such operation, and the like.

For example, in the following description, a two-wheeled motor vehicle is exemplified as the lean vehicle. However, the lean vehicle means a vehicle in general, a body of which is tilted in a turning direction during a turn. Thus, the lean vehicle is not limited to the two-wheeled motor vehicle. Examples of the lean vehicle include motorcycles whose bodies are tilted in the turning direction during the turn (the two-wheeled motor vehicle and a three-wheeled motor vehicle whose body is tilted in the turning direction during the turn), and pedal-driven vehicles. In addition, the motorcycle whose body is tilted in the turning direction during the turn may have an engine as a propelling source or may have a motor as the propelling source, and examples of the motorcycle are a bike, a scooter, and an electric scooter. The pedal-driven vehicle means a vehicle in general that can travel forward on a road by a depression force applied to pedals by a rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

A description will hereinafter be made on a behavior controller according to a first embodiment, a lean vehicle including the controller, and a behavior control method according to the first embodiment.

<Configurations of Lean Vehicle and Behavior Controller>

FIG. 1 and FIG. 2 are front views of the lean vehicle according to the first embodiment of the present invention.

FIG. 1 illustrates an upright state of a body of a lean vehicle 100. FIG. 2 illustrates a state where the lean vehicle 100 makes a turn and the body of the lean vehicle 100 is tilted in a turning direction. A Z-axis illustrated in FIG. 1 and FIG. 2 is an axis in a vertical direction. A Y-axis illustrated in FIG. 1 and FIG. 2 is an axis in a horizontal direction that is perpendicular to an advancing direction of the lean vehicle 100.

The lean vehicle 100 includes a behavior control system 1 that controls behavior of the lean vehicle 100. This behavior control system 1 includes an acceleration sensor 11 and a behavior controller 20.

The acceleration sensor 11 detects acceleration information in a body up-down direction of the lean vehicle 100. In this first embodiment, the acceleration sensor 11 detects acceleration in the body up-down direction of the lean vehicle 100. In the upright state of the body of the lean vehicle 100, the acceleration information in the body up-down direction of the lean vehicle 100 is acceleration information in the Z-axis direction. Meanwhile, in the state where the lean vehicle 100 makes the turn and the body of the lean vehicle 100 is tilted in the turning direction, the acceleration information in the body up-down direction of the lean vehicle 100 is acceleration information in a direction in which the lean vehicle 100 is tilted with respect to the Z-axis direction (in a direction a1 indicated in FIG. 2) when seen in the front view. The acceleration information that is detected by the acceleration sensor 11 may be another physical quantity that can substantially be converted to the acceleration. In addition to the acceleration sensor 11, the behavior control system 1 may include a sensor other than the acceleration sensor 11. In such a case, these sensors may be formed separately or may be unitized.

The behavior controller 20 controls the behavior of the lean vehicle 100 on the basis of output of the at least one acceleration sensor that is mounted to the lean vehicle 100. For example, the behavior controller 20 is partially or entirely constructed of a microcomputer, a microprocessor unit, or the like. Alternatively, the behavior controller 20 may partially or entirely be constructed of one whose firmware and the like can be updated, or may partially or entirely be a program module or the like that is executed by a command from a CPU or the like, for example. The behavior controller 20 may be provided as a single unit or may be divided into plural units, for example. The behavior controller 20 can be configured as follows, for example.

FIG. 3 is a block diagram illustrating the behavior control system according to the first embodiment of the present invention.

The behavior controller 20 in the behavior control system 1 according to this first embodiment includes, as functional sections, an acceleration information acquisition section 21, a vehicle velocity information acquisition section 22, a first angular velocity information acquisition section 23, and a control section 24.

The acceleration information acquisition section 21 acquires the acceleration information in the body up-down direction of the lean vehicle 100 on the basis of the output of the at least one acceleration sensor that is mounted to the lean vehicle 100. In this first embodiment, the acceleration information acquisition section 21 acquires the acceleration that is detected by the acceleration sensor 11. The acceleration information that is acquired by the acceleration information acquisition section 21 may be another physical quantity that can substantially be converted to the acceleration. In addition, the acceleration information that is acquired by the acceleration information acquisition section 21 may be an output value of the acceleration sensor 11, or may be a physical quantity that is converted from the output value of the acceleration sensor 11.

The vehicle velocity information acquisition section 22 acquires vehicle velocity information of the lean vehicle 100. The vehicle velocity information of the lean vehicle 100 may be a vehicle velocity of the lean vehicle 100 that is acquired from a speedometer or the like, or may be another physical quantity (a wheel rotational frequency, location information by the GPS, or the like) that can substantially be converted to the vehicle velocity of the lean vehicle 100.

The first angular velocity information acquisition section 23 acquires first angular velocity information of the lean vehicle 100 by using the acceleration information acquired by the acceleration information acquisition section 21 and the vehicle velocity information acquired by the vehicle velocity information acquisition section 22. In this first embodiment, the first angular velocity information acquisition section 23 acquires, as the first angular velocity information, an angular velocity of the lean vehicle 100 by using these pieces of the acceleration information and the vehicle velocity information. More specifically, in this first embodiment, the first angular velocity information acquisition section 23 acquires at least one of a yaw rate and a pitch rate of the lean vehicle 100. The first angular velocity information that is acquired by the first angular velocity information acquisition section 23 may be another physical quantity that can substantially be converted to the angular velocity.

For example, the first angular velocity information acquisition section 23 can acquire the yaw rate and the pitch rate of the lean vehicle 100 as follows.

A velocity V and acceleration α of an object that rotates about a reference axis can be expressed as follows by using an angular velocity ω around the reference axis and a rotation radius R (a distance between the reference axis and the object).

$$V = R \times \omega \tag{1}$$

$$\alpha = R \times \omega^2 = V \times \omega \tag{2}$$

In this way, the following equation (3) is obtained by deforming the equation (2).

$$Q_\omega = \alpha / V \tag{3}$$

The yaw rate of the lean vehicle 100 is an angular velocity of the lean vehicle 100 around the Z-axis. Thus, when the yaw rate of the lean vehicle 100 is calculated by using the equation (3), the velocity V in the equation (3) is a vehicle velocity V1 of the lean vehicle 100. Meanwhile, the acceleration that contributes to the rotation of the lean vehicle 100 around the Z-axis is acceleration that acts in the Y-axis direction. Thus, the acceleration α in the equation (3) is acceleration of the lean vehicle 100 in the Y-axis direction.

Here, as illustrated in FIG. 2, the acceleration in the body up-down direction of the lean vehicle 100 is set as acceleration a1. In the turning lean vehicle 100, the direction of the acceleration a1 is a direction that is tilted with respect to the Z-axis and the Y-axis. Thus, acceleration a11 of the lean vehicle 100 in the Y-axis direction is an acceleration component in the Y-axis direction of the acceleration a1. In addition, an acceleration component in the Z-axis direction of the acceleration a1 is gravitational acceleration g. Accordingly, the acceleration a11 of the lean vehicle 100 in the Y-axis direction can be calculated by the following equation (4) using the Pythagorean theorem.

$$a11 = \left(a1^2 - g^2\right)^{1/2} \tag{4}$$

Thus, when the yaw rate of the lean vehicle 100 is expressed as a yaw rate ωy, from the equation (3) and the equation (4), the yaw rate ωy of the lean vehicle 100 can be calculated by the following equation (5).

$$\omega y = a11 / V1 \tag{5}$$

The pitch rate of the lean vehicle 100 is an angular velocity around an axis that is perpendicular to the advancing direction of the lean vehicle 100 and is perpendicular to the body up-down direction of the lean vehicle 100. That is, in FIG. 2, the pitch rate of the lean vehicle 100 is an angular velocity around an axis that is perpendicular to the acceleration a1 in the body up-down direction of the lean vehicle 100. Thus, when the pitch rate of the lean vehicle 100 is calculated by using the equation (3), the velocity V in the equation (3) is the vehicle velocity V1 of the lean vehicle 100. In addition, acceleration that contributes to the rotation of the lean vehicle 100 around the perpendicular axis to the acceleration a1 in the body up-down direction of the lean vehicle 100 is the acceleration a1 in the body up-down direction of the lean vehicle 100. Thus, when the pitch rate of the lean vehicle 100 is expressed as a pitch rate ωp, from the equation (3), the pitch rate ωp of the lean vehicle 100 can be calculated by the following equation (6).

$$\omega p = a1 / V1 \tag{6}$$

In addition, from the equation (5) and the equation (6), the yaw rate ωy of the lean vehicle 100 can be calculated by the following equation (7).

$$\omega y = \omega p \times a11 / a1 \tag{7}$$

That is, the yaw rate ωy of the lean vehicle 100 can also be calculated from the pitch rate op of the lean vehicle 100 by using a ratio between the acceleration a1 and the acceleration a11.

Similarly, as expressed by the following equation (8), the pitch rate ωp of the lean vehicle 100 can also be calculated from the yaw rate ωy of the lean vehicle 100 by using the ratio between the acceleration a1 and the acceleration a11.

$$\omega p = \omega y \times a1 / a11 \tag{8}$$

The first angular velocity information acquisition section 23 according to this first embodiment can also calculate a roll rate of the lean vehicle 100 by using the acceleration information acquired by the acceleration information acquisition section 21. For example, the first angular velocity information acquisition section 23 can calculate the roll rate of the lean vehicle 100 as follows. In the case where the acceleration a1 in the body up-down direction of the lean vehicle 100 is the same, the acceleration a11, which is the acceleration component in the Y-axis direction of the acceleration a1, is increased as the tilt of the body of the lean vehicle 100 during the turn is increased, that is, as the lean angle is increased. Thus, the lean angle of the lean vehicle 100 can be calculated on the basis of a magnitude of the acceleration a11 with respect to the acceleration a1, in other words, on the basis of a value that is acquired by dividing the acceleration a11 by the acceleration a1. The roll rate of the lean vehicle 100 can be considered as a change amount per unit time of the lean angle of the lean vehicle 100. Thus, the roll rate of the lean vehicle 100 can be calculated on the basis of a change amount per unit time of the magnitude of the acceleration a11 with respect to the acceleration a1.

When acquiring the first angular velocity information, the first angular velocity information acquisition section 23 may calculate the first angular velocity information on the basis of the stored equations, or may calculate the first angular velocity information by using a table in which parameters in the equations are associated with the first angular velocity information.

The control section 24 controls the behavior of the lean vehicle 100 on the basis of the acceleration information acquired by the acceleration information acquisition section 21, the first angular velocity information acquired by the first angular velocity information acquisition section 23, and the like.

<Operation of Behavior Controller>

A description will be made on operation of the behavior controller 20 according to the first embodiment.

Figure 4:
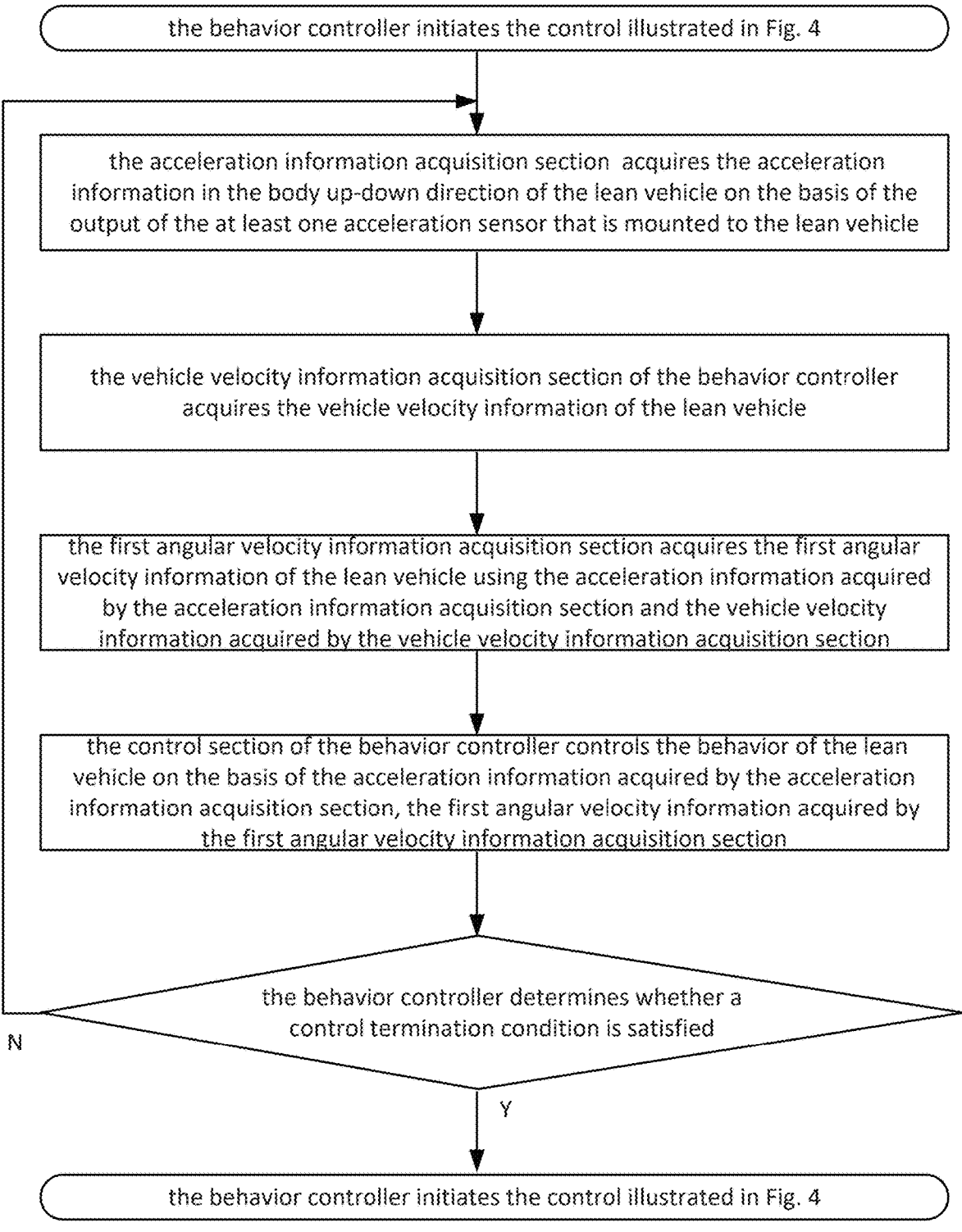
FIG. 4 is a chart illustrating a control flow of exemplary operation of a behavior controller according to the first embodiment of the present invention.

FIG. 4 is a chart illustrating a control flow of exemplary operation of the behavior controller according to the first embodiment of the present invention.

When a control initiation condition is satisfied, in step S1, the behavior controller 20 initiates the control illustrated in FIG. 4. An example of the control initiation condition is a time when an engine of the lean vehicle 100 is started. Step S2 is an acceleration information acquisition step. In step S2, the acceleration information acquisition section 21 of the behavior controller 20 acquires the acceleration information in the body up-down direction of the lean vehicle 100 on the basis of the output of the at least one acceleration sensor that is mounted to the lean vehicle 100. In this first embodiment, the acceleration information acquisition section 21 acquires the acceleration that is detected by the acceleration sensor 11.

Step S3, which follows step S2, is a vehicle velocity information acquisition step. In step S3, the vehicle velocity information acquisition section 22 of the behavior controller 20 acquires the vehicle velocity information of the lean vehicle 100. Step S4, which follows step S3, is an angular velocity information acquisition step. In step S4, the first angular velocity information acquisition section 23 of the behavior controller 20 acquires the first angular velocity information of the lean vehicle 100 by using the acceleration information acquired by the acceleration information acquisition section 21 and the vehicle velocity information acquired by the vehicle velocity information acquisition section 22.

Step S5, which follows step S4, is a control step. In step S5, the control section 24 of the behavior controller 20 controls the behavior of the lean vehicle 100 on the basis of the acceleration information acquired by the acceleration information acquisition section 21, the first angular velocity information acquired by the first angular velocity information acquisition section 23, and the like. Step S6, which follows step S5, is a termination determination step. In step S6, the behavior controller 20 determines whether a control termination condition is satisfied. An example of the control termination condition is a time when the engine of the lean vehicle 100 is stopped. If the control termination condition is satisfied, the processing proceeds to step S7, and the behavior controller 20 terminates the control illustrated in FIG. 4. On the other hand, if the control termination condition is not satisfied, the behavior controller 20 repeats the processing in step S2 to step S6.

<Effects of Behavior Controller>

The behavior controller 20 is the behavior controller that controls the behavior of the lean vehicle 100. The behavior controller 20 includes the acceleration information acquisition section 21, the vehicle velocity information acquisition section 22, and the first angular velocity information acquisition section 23. The acceleration information acquisition section 21 acquires the acceleration information in the body up-down direction of the lean vehicle 100 on the basis of the output of the at least one acceleration sensor. The vehicle velocity information acquisition section 22 acquires the vehicle velocity information of the lean vehicle 100. The first angular velocity information acquisition section 23 acquires the first angular velocity information of the lean vehicle 100 by using the acceleration information acquired by the acceleration information acquisition section 21 and the vehicle velocity information acquired by the vehicle velocity information acquisition section 22.

Conventionally, the behavior controller that controls the behavior of the lean vehicle is configured to control the behavior of the lean vehicle on the basis of the output of the inertial measurement unit mounted to the lean vehicle. In other words, conventionally, the behavior control system that controls the behavior of the lean vehicle is configured to include: the inertial measurement unit mounted to the lean vehicle; and the behavior controller that controls the behavior of the lean vehicle on the basis of the output of the inertial measurement unit. Here, the inertial measurement unit includes: the acceleration sensor that detects the acceleration in the mutually orthogonal three-axis directions; and the angular velocity sensor that detects the angular velocity around each of the above-described three axes. In other words, the inertial measurement unit includes the three acceleration sensors and the three angular velocity sensors. That is, the conventional behavior controller for the lean vehicle is based on the premise of controlling the behavior of the lean vehicle on the basis of the output of each of the sensors in the inertial measurement unit. For this reason, the conventional behavior control system for the lean vehicle must always include the three acceleration sensors and the three angular velocity sensors, and thus is not generally versatile.

Meanwhile, the behavior controller 20 according to this first embodiment acquires the angular velocity information on the basis of the output of the acceleration sensor. Thus, the behavior control system 1 for the lean vehicle 100 that uses the behavior controller 20 according to this first embodiment does not always have to include all the sensors in the inertial measurement unit. Therefore, with the behavior controller 20 according to this first embodiment, general versatility of the behavior control system 1 can be improved when compared to that of the conventional behavior control system.

For example, the behavior controller 20 may be configured to control the behavior of the lean vehicle 100 not on the basis of the output of the angular velocity sensor. In this case, the behavior control system 1 does not have to include the angular velocity sensor, and thus cost of the behavior control system 1 can be cut. That is, cost of the lean vehicle 100 can be cut.

As will be described in this second embodiment, the behavior control system 1 may include the angular velocity sensor. In this second embodiment, a description will be made on an example of the behavior controller 20 for the behavior control system 1 that includes the angular velocity sensor. Matters, which will not be described in this second embodiment, are the same as those in the first embodiment.

FIG. 5 is a block diagram illustrating the behavior control system according to the second embodiment of the present invention.

The behavior control system 1 according to this second embodiment includes an angular velocity sensor 13 in addition to the components in the first embodiment. The angular velocity sensor 13 detects the angular velocity information of the lean vehicle 100. In this second embodiment, the angular velocity sensor 13 detects the angular velocity of the lean vehicle 100. More specifically, the angular velocity sensor 13 detects the pitch rate of the lean vehicle 100. That is, a pitch rate sensor that detects the pitch rate of the lean vehicle 100 is used as the angular velocity sensor 13. The angular velocity sensor 13 may be the angular velocity sensor other than the pitch rate sensor, and may detect the angular velocity other than the pitch rate of the lean vehicle 100. In addition, the angular velocity information detected by the angular velocity sensor 13 may be another physical quantity that can substantially be converted to the angular velocity.

The behavior controller 20 according to this second embodiment includes, as functional sections, a second angular velocity information acquisition section 25 and a comparison section 26 in addition to the components in the first embodiment. The second angular velocity information acquisition section 25 acquires second angular velocity information on the basis of output of the angular velocity sensor 13. In this second embodiment, the second angular velocity information acquisition section 25 acquires, as the second angular velocity information, the pitch rate of the lean vehicle 100 detected by the angular velocity sensor 13. The second angular velocity information acquired by the second angular velocity information acquisition section 25 may be the angular velocity other than the pitch rate, and may be another physical quantity that can substantially be converted to the angular velocity. For example, as expressed by the equation (7), the pitch rate of the lean vehicle 100 can substantially be converted to the yaw rate of the lean vehicle 100. Thus, for example, the behavior controller 20 may acquire the yaw rate of the lean vehicle 100 as the second angular velocity information on the basis of the output of the angular velocity sensor 13 that detects the pitch rate.

The comparison section 26 compares the first angular velocity information acquired by the first angular velocity information acquisition section 23 with the second angular velocity information acquired by the second angular velocity information acquisition section 25. In other words, the first angular velocity information is a first physical quantity that is acquired on the basis of the detection value by the acceleration sensor 11. The second angular velocity information is a second physical quantity that is acquired on the basis of the detection value by the angular velocity sensor 13 and is the same type of the physical quantity as the first physical quantity. Then, the comparison section 26 compares the first physical quantity with the second physical quantity. Thus, the behavior controller 20 that includes the comparison section 26 can monitor whether the acceleration sensor 11 and the angular velocity sensor 13 are operated normally on the basis of a comparison result by the comparison section 26. The comparison result by the comparison section 26 is used as follows, for example.

For example, the behavior controller 20 may use the comparison result between the first angular velocity information and the second angular velocity information by the comparison section 26 to control the behavior of the lean vehicle 100. More specifically, for example, in the case where there is a significant difference between the first angular velocity information and the second angular velocity information, of the control operation used to control the behavior of the lean vehicle 100, the control section 24 of the behavior controller 20 does not execute the control operation that is executed on the basis of the output of at least one of the acceleration sensor 11 and the angular velocity sensor 13. This is because, when there is the significant difference between the first angular velocity information and the second angular velocity information, there is a possibility that at least one of the acceleration sensor 11 and the angular velocity sensor 13 is not operated normally. An example of the case where there is the significant difference between the first angular velocity information and the second angular velocity information is a case where the difference between the first angular velocity information and the second angular velocity information is equal to or larger than a preset value. By using the comparison result between the first angular velocity information and the second angular velocity information by the comparison section 26 as described above, it is possible to suppress the behavior of the lean vehicle 100 from being controlled by using the sensor that is not operated normally. Thus, safety of the lean vehicle 100 is improved.

The control section 24 of the behavior controller 20 according to this second embodiment controls the behavior of the lean vehicle 100 on the basis of the acceleration information acquired by the acceleration information acquisition section 21, the first angular velocity information acquired by the first angular velocity information acquisition section 23, the second angular velocity information acquired by the second angular velocity information acquisition section 25, and the like. At this time, in the case where the same angular velocity information (for example, pitch rate information) is acquired by both of the first angular velocity information acquisition section 23 and the second angular velocity information acquisition section 25, the control section 24 only needs to use the angular velocity information acquired by at least one thereof to control the behavior of the lean vehicle 100.

In addition, for example, the comparison result by the comparison section 26 may be used as in the following modified examples.

MODIFIED EXAMPLES

FIG. 6 is a front view of a lean vehicle according to a modified example of the second embodiment of the present invention. FIG. 7 is a block diagram illustrating a behavior control system for a lean vehicle according to the modified example of the second embodiment of the present invention.

As illustrated in FIG. 6, the lean vehicle 100 according to the modified example of this second embodiment includes a display device 101 that is an example of a notification device.

As illustrated in FIG. 7, the behavior controller 20 according to the modified example of this second embodiment includes, as the functional section, a notification operation execution section 27 in addition to the components illustrated in FIG. 5. The notification operation execution section 27 outputs a signal for causing the notification device to make a notification in the case where, in the comparison section 26, the difference between the first angular velocity information and the second angular velocity information becomes equal to or larger than the preset value. An example of a specific notification content is that there is the possibility that at least one of the acceleration sensor 11 and the angular velocity sensor 13 is not operated normally. As described above, in the modified example illustrated in FIG. 6 and FIG. 7, the display device 101 is used as the notification device. Accordingly, in the modified example illustrated in FIG. 6 and FIG. 7, in the case where, the difference between the first angular velocity information and the second angular velocity information becomes equal to or larger than the preset value in the comparison section 26, the notification operation execution section 27 outputs a signal that causes the display device 101 to provide a display. In this way, in the case where the difference between the first angular velocity information and the second angular velocity information becomes equal to or larger than the preset value in the comparison section 26, the display device 101 shows that there is the possibility that at least one of the acceleration sensor 11 and the angular velocity sensor 13 is not operated normally, for example.

However, the notification device is not limited to the display device 101. For example, a speaker or the like that is provided to the lean vehicle 100 may be used as the notification device to notify by sound that there is the possibility that at least one of the acceleration sensor 11 and the angular velocity sensor 13 is not operated normally. In this case, the notification operation execution section 27 outputs a notification signal for causing the notification device such as the speaker to output the sound in the case where the difference between the first angular velocity information and the second angular velocity information becomes equal to or larger than the preset value in the comparison section 26. However, the notification device that receives the notification signal output from the notification operation execution section 27 is not limited to the component provided to the lean vehicle 100. The notification device may be an accessory that is associated with the lean vehicle 100, and examples of the accessory are a helmet and gloves worn by a driver of the lean vehicle 100. That is, the notification operation execution section 27 may output the notification signal to the accessory associated with the lean vehicle 100, and the accessory may make the notification.

In the lean vehicle 100 that is configured as in the modified example illustrated in FIG. 6 and FIG. 7, with the notification from the notification device, the driver of the lean vehicle 100 can recognize the possibility that at least one of the acceleration sensor 11 and the angular velocity sensor 13 is not operated normally. Therefore, the safety of the lean vehicle 100, which is configured as in the modified example illustrated in FIG. 6 and FIG. 7, is improved. However, it is needless to say that, also in the modified example illustrated in FIG. 6 and FIG. 7, the behavior controller 20 can use the comparison result between the first angular velocity information and the second angular velocity information by the comparison section 26 to control the behavior of the lean vehicle 100. As a result, the safety of the lean vehicle 100 is further improved.

Similar to the behavior control system 1 described in the first embodiment, the behavior control system 1 according to this second embodiment may include a sensor other than the acceleration sensor 11 and the angular velocity sensor 13 in addition thereto. At this time, together with the other sensor, the acceleration sensor 11 and the angular velocity sensor 13 are possibly unitized as a measurement unit. The behavior control system 1 according to this second embodiment that includes such a measurement unit can exert the following effects. In the conventional idea, the behavior controller in the behavior control system that includes such a measurement unit does not execute control operation that is based on the output of all the sensors constituting the measurement unit when recognizing failure of the measurement unit. In other words, in the conventional idea, the behavior controller in the behavior control system that includes such a measurement unit does not execute the control operation when recognizing the failure of the measurement unit even in the case where such control operation is operation that is executed on the basis of the output of the normally operated sensor in the measurement unit. However, in regard to the behavior controller 20 in the behavior control system 1 according to this second embodiment, even when recognizing the failure of the measurement unit, the behavior controller 20 can recognize that the acceleration sensor 11 and the angular velocity sensor 13 are operated normally on the basis of the comparison result between the first angular velocity information and the second angular velocity information by the comparison section 26. Thus, even when recognizing the failure of the measurement unit, the behavior controller 20 in the behavior control system 1 according to this second embodiment can continue the control operation that is executed on the basis of the output of the acceleration sensor 11 and the angular velocity sensor 13. As a result, the safety of the lean vehicle 100 is improved.

Here, in order to obtain the behavior control system 1 according to this second embodiment, as described above, the at least one angular velocity sensor (the angular velocity sensor 13) is necessary. This angular velocity sensor 13 is preferably the pitch rate sensor. The behavior control system 1 according to this second embodiment only needs to at least include the acceleration sensor 11 and the angular velocity sensor 13. Thus, compared to the conventional behavior control system that includes the inertial measurement unit, the number of the sensors can be reduced. That is, compared to the conventional behavior control system that includes the inertial measurement unit, the cost of the behavior control system 1 according to this second embodiment can be cut. Such a low-cost behavior control system 1 is suitable for use in the small-sized lean vehicle 100 (in other words, the inexpensive lean vehicle 100). In this case, since the small-sized lean vehicle 100 tends to have a short wheelbase with respect to a height of center of gravity, the behavior in a pitch direction becomes significant during deceleration or the like. For this reason, safety of the small-sized lean vehicle 100 is improved when the pitch rate thereof can be detected directly. Thus, the angular velocity sensor 13 is preferably the pitch rate sensor.

In the case where the angular velocity sensor 13 is the pitch rate sensor, the behavior controller 20 is preferably configured to control the behavior of the lean vehicle 100 not on the basis of the output of the angular velocity sensor other than the pitch rate sensor. This is because, since the angular velocity sensor other than the pitch rate sensor becomes unnecessary, the cost of the behavior control system 1 can be cut. That is, this is because the cost of the lean vehicle 100 can be cut.

In the first embodiment and the second embodiment, the acceleration information acquisition section 21 in the behavior controller 20 acquires the acceleration information in the body up-down direction of the lean vehicle 100 on the basis of the output of the single acceleration sensor. However, as described in the first embodiment, the acceleration information acquisition section 21 only needs to acquire the acceleration information in the body up-down direction of the lean vehicle 100 on the basis of the output of the at least one acceleration sensor. Accordingly, for example, as in this third embodiment, the acceleration information acquisition section 21 may acquire the acceleration information in the body up-down direction of the lean vehicle 100 on the basis of output of two acceleration sensors that detect the acceleration in different directions from each other. It is assumed that matters not described in this third embodiment are the same as those in the first embodiment or the second embodiment.

FIG. 8 is a side view of a lean vehicle according to the third embodiment of the present invention.

In FIG. 8, a left side of the sheet corresponds to a front side of the lean vehicle 100. An X-axis illustrated in FIG. 8 is an axis of the lean vehicle 100 in a straight advancing direction.

The behavior control system 1 according to this third embodiment includes the acceleration sensor 11 and an acceleration sensor 12. In a state where the lean vehicle 100 is seen from the front, a direction in the acceleration information detected by the acceleration sensor 11 and the acceleration sensor 12 is the body up-down direction of the lean vehicle 100. Meanwhile, in a state where the lean vehicle 100 is seen from the side, the direction in the acceleration information detected by the acceleration sensor 11 and the acceleration sensor 12 is tilted with respect to the body up-down direction of the lean vehicle 100. For example, the direction of the acceleration a1 detected by the acceleration sensor 11 is a direction indicated in FIG. 8. In addition, a direction of acceleration a2 detected by the acceleration sensor 12 is a direction indicated in FIG. 8. In the state where the lean vehicle 100 is seen from the side, the direction of the acceleration a1 detected by the acceleration sensor 11 and the direction of the acceleration a2 detected by the acceleration sensor 12 are tilted by 90°, for example.

In the case where the behavior control system 1 is configured just as described, the acceleration information acquisition section 21 in the behavior controller 20 can acquire the acceleration information in the body up-down direction of the lean vehicle 100 by adding a component in the body up-down direction of the lean vehicle 100 of the acceleration information detected by the acceleration sensor 11 and a component in the body up-down direction of the lean vehicle 100 of the acceleration information detected by the acceleration sensor 12.

Just as described, the acceleration information acquisition section 21 can also acquire the acceleration information in the body up-down direction of the lean vehicle 100 on the basis of the output of the two acceleration sensors. Thus, even when the behavior controller 20 is configured as described in this third embodiment, the general versatility of the behavior control system 1 can be improved when compared to the conventional behavior control system.

In addition, in the case where the behavior control system 1 is configured to acquire the acceleration information in the body up-down direction of the lean vehicle 100 on the basis of the output of the two acceleration sensors, the following effects can be exerted.

The components in the same direction are acquired from the acceleration information detected by the acceleration sensor 11 and the acceleration information detected by the acceleration sensor 12. For example, the components in the X-axis direction are acquired from the acceleration information detected by the acceleration sensor 11 and the acceleration information detected by the acceleration sensor 12. For example, the acceleration information acquisition section 21 acquires these components. Then, by comparing these components, it is possible to monitor whether the acceleration sensor 11 and the acceleration sensor 12 are operated normally on the basis of the comparison result. This is because, when there is a significant difference between these components, there is a possibility that at least one of the acceleration sensor 11 and the acceleration sensor 12 is not operated normally. For example, the comparison section 26 compares these components. In addition, a comparison result of these components can be used as follows, for example. Hereinafter, the difference in these components will be expressed as an acceleration component difference.

For example, in the case where the acceleration component difference is significant, of the control operation used to control the behavior of the lean vehicle 100, the control section 24 in the behavior controller 20 does not execute the control operation that is executed on the basis of the output of at least one of the acceleration sensor 11 and the acceleration sensor 12. An example of the case where the acceleration component difference is significant is a case where the acceleration component difference is equal to or larger than the preset value. In this way, it is possible to suppress the behavior of the lean vehicle 100 from being controlled by using the sensor that is not operated normally. Thus, the safety of the lean vehicle 100 is improved.

For example, in the case where the behavior controller 20 includes the notification operation execution section 27 as in the second embodiment and the acceleration component difference becomes equal to or larger than the preset value, the notification operation execution section 27 may output the signal for notifying the notification device. In this way, with the notification from the notification device, the driver of the lean vehicle 100 can recognize the possibility that at least one of the acceleration sensor 11 and the acceleration sensor 12 is not operated normally. Thus, the safety of the lean vehicle 100 is improved.

It is assumed that, together with the other sensor, the acceleration sensor 11 and the acceleration sensor 12 are unitized as a measurement unit, for example. In this case, even when recognizing the failure of the measurement unit, the behavior controller 20 can recognize that the acceleration sensor 11 and the acceleration sensor 12 are operated normally on the basis of the acceleration component difference. Thus, even when recognizing the failure of the measurement unit, the behavior controller 20 can continue the control operation that is executed on the basis of the acceleration sensor 11 and the acceleration sensor 12. Thus, the safety of the lean vehicle 100 is improved.

Meanwhile, in the case of the configuration that the acceleration information in the body up-down direction of the lean vehicle 100 is acquired on the basis of the output of the single acceleration sensor, it is possible to cut the cost of the behavior control system 1 by eliminating the acceleration sensor 12, and thus the cost of the lean vehicle 100 can be cut.

The description has been made so far on the example of the behavior controller according to the present invention in each of the embodiments. However, the behavior controller according to the present invention is not limited to the description of each of the embodiments. For example, all or parts of the embodiments may be combined to constitute the behavior controller according to the present invention.

REFERENCE SIGNS LIST

1: Behavior control system
11: Acceleration sensor
12: Acceleration sensor
13: Angular velocity sensor
20: Behavior controller
21: Acceleration information acquisition section
22: Vehicle velocity information acquisition section
23: First angular velocity information acquisition section
24: Control section
25: Second angular velocity information acquisition section
26: Comparison section
27: Notification operation execution section
100: Lean vehicle
101: Display device

The invention claimed is:

1. A behavior controller (20) for controlling behavior of a lean vehicle (100), the behavior controller (20) comprising:
   an acceleration information acquisition section (21) that acquires acceleration information in a body up-down direction of the lean vehicle (100) on a basis of output of at least one acceleration sensor;
   a vehicle velocity information acquisition section (22) that acquires vehicle velocity information of the lean vehicle (100);

a first angular velocity information acquisition section (23) that acquires first angular velocity information by using the acceleration information and the vehicle velocity information, wherein the behavior controller is configured to control the behavior of the lean vehicle (100) not on the basis of an output of an angular velocity sensor.

2. The behavior controller (20) according to claim 1 further comprising:

a second angular velocity information acquisition section (25) that acquires second angular velocity information on the basis of output of an angular velocity sensor (13); and a comparison section (26) that compares the first angular velocity information with the second angular velocity information.

3. The behavior controller (20) according to claim 2 configured to use a comparison result between the first angular velocity information and the second angular velocity information by the comparison section (26) to control the behavior of the lean vehicle (100).

4. The behavior controller (20) according to claim 2 further comprising:

a notification operation execution section (27) that outputs a signal for notification by a notification device (101) in the case where, in the comparison section (26), a difference between the first angular velocity information and the second angular velocity information becomes equal to or larger than a preset value.

5. The behavior controller (20) according to claim 2, wherein the angular velocity sensor (13) is a pitch rate sensor that detects a pitch rate.

6. The behavior controller (20) according to claim 5 configured to control the behavior of the lean vehicle (100) not on the basis of output of an angular velocity sensor other than the pitch rate sensor.

7. The behavior controller (20) according to claim 1 configured to acquire the acceleration information on the basis of output of a single acceleration sensor (11).

8. The behavior controller (20) according to claim 1 configured to acquire the acceleration information on the basis of output of the two acceleration sensors (11, 12) that detect acceleration information in different directions from each other.

9. A lean vehicle (100) comprising:

the behavior controller (20) according to claim 1.

10. A behavior control method for controlling behavior of a lean vehicle (100), the behavior control method comprising:

an acceleration information acquisition step (S2) of acquiring acceleration information in a body up-down direction of the lean vehicle (100) on a basis of output of at least one acceleration sensor;

a vehicle velocity information acquisition step (S3) of acquiring vehicle velocity information of the lean vehicle (100); and an angular velocity information acquisition step (S4) of acquiring angular velocity information by using the acceleration information and the vehicle velocity information, a vehicle behavior control step (S5) of controlling, using the first angular velocity information of the first angular velocity information acquisition section (23), the behavior of the lean vehicle (100) not on the basis of an output of an angular velocity sensor.

11. A behavior controller (20) for controlling behavior of a lean vehicle (100), the behavior controller (20) comprising:

an acceleration information acquisition section (21) that acquires acceleration information in a body up-down direction of the lean vehicle (100) on a basis of output of at least one acceleration sensor;

a vehicle velocity information acquisition section (22) that acquires vehicle velocity information of the lean vehicle (100);

a first angular velocity information acquisition section (23) that acquires first angular velocity information by using the acceleration information and the vehicle velocity information;

a second angular velocity information acquisition section (25) that acquires second angular velocity information on the basis of output of an angular velocity sensor (13);

a comparison section (26) that compares the first angular velocity information with the second angular velocity information; and a notification operation execution section (27) that outputs a signal for notification by a notification device (101) in the case where, in the comparison section (26), a difference between the first angular velocity information and the second angular velocity information becomes equal to or larger than a preset value.

* * * * *